United States Patent
Mc Garel et al.

(10) Patent No.: US 6,630,214 B1
(45) Date of Patent: Oct. 7, 2003

(54) IMPROVING REWET SHRINK PROPERTIES OF CASING

(75) Inventors: Owen Joseph Mc Garel, Naperville, IL (US); Merlan Elroy McAllister, Clarendon Hills, IL (US)

(73) Assignee: Viskase Corporation, Willowbrook, IL (US)

( * ) Notice: Subject to any disclaimer, the term of this patent is extended or adjusted under 35 U.S.C. 154(b) by 0 days.

(21) Appl. No.: 09/441,517

(22) Filed: Nov. 17, 1999

(51) Int. Cl.$^7$ .................. A22C 13/00; B29D 22/00; B29D 22/02
(52) U.S. Cl. ............ 428/34.8; 428/34.9; 428/35.1; 428/35.2; 428/35.7; 428/36.9; 426/105; 426/135; 426/143
(58) Field of Search .............. 428/34.3, 34.8, 428/35.1, 35.2, 35.7, 36.9; 426/105, 135, 143

(56) References Cited

U.S. PATENT DOCUMENTS

| | | |
|---|---|---|
| 2,492,441 A | 12/1949 | Reichel ................. 99/176 |
| 2,999,757 A | 9/1961 | Shiner ................. 428/34.8 |
| 3,280,234 A | 10/1966 | Osborn ................. 264/558 |
| 5,277,857 A | 1/1994 | Nicholson ............. 264/187 |
| 5,451,364 A | 9/1995 | DuCharme, Jr. ....... 264/559 |
| 5,658,524 A | 8/1997 | Portnoy ............... 264/559 |
| 5,807,595 A | 9/1998 | Verschueren .......... 426/105 |
| 5,952,064 A | 9/1999 | van der Bleek ....... 428/34.8 |
| 5,989,605 A | 11/1999 | Verschueren .......... 426/105 |

FOREIGN PATENT DOCUMENTS

EP    0 922 390 A1    6/1999

Primary Examiner—Shrive P. Beck
Assistant Examiner—Elena Tsoy
(74) Attorney, Agent, or Firm—Roger Aceto; Donna Bobrowicz

(57) ABSTRACT

Disclosed is a method of forming a seamless, non derivatized cellulose tubular film having enhanced rewet shrinkage properties. The enhanced properties are provided by first drying a hydrated extruded tube of non derivatized cellulose gel at one inflated diameter to form a tubular film. The film is then moisturized while holding an inflated diameter smaller than the drying diameter.

6 Claims, 3 Drawing Sheets

IMPROVING REWET SHRINK PROPERTIES OF CASING

TECHNICAL FIELD

The present invention relates to a method of controlling the rewet shrinkage of a tubular film of non derivatized cellulose to enhance its value as a food casing.

BACKGROUND OF THE INVENTION

The use of tubular cellulose films as food casings is well known in the art. A non reinforced type of cellulose casing commonly is used in the manufacture of various sausage products such as frankfurters and the like. These cellulose films generally consist of a tubular film of pure regenerated cellulose having a wall thickness ranging from 0.025 to 0.038 mm and ranging in diameters from about 14 to 50 mm.

To date, the most notorious process for manufacturing cellulose food casings is the "viscose process." In the viscose process a natural cellulose is such as cotton linters or wood pulp is converted to a soluble cellulose derivative (cellulose xanthate) by chemical reaction. The soluble cellulose derivative is extruded as a tube and contacted with reagents that react chemically with the cellulose derivative to regenerate a pure form of cellulose.

A more recent innovation for the production of cellulose food casings involves the simple dissolution of the natural cellulose without chemical reaction. In this process the natural cellulose is solubilized by a tertiary amine N-oxide such as N-methyl-morpholine-N-oxide ("NMMO"). The solution is thermoplastic in that it is solid at room temperature and has a melting point of about 65° C. The solution is extruded as a tube into a bath containing a liquid that is a non solvent for cellulose (such as water) where the solvent is extracted to regenerate a pure form of cellulose. The cellulose derived from this process is "non derivatized" in that it has not been subjected to covalent bonding with a solvent or reagent as is the "derivatized" cellulose derived from the viscose process. Instead, the non derivatized cellulose has been dissolved by association with a solvent or reagent through Van der Waals forces or by hydrogen bonding.

Regardless of the process used, the regenerated cellulose immediately after tubular extrusion and regeneration is in a gel state. This tubing of cellulose gel is contacted with a plasticizing agent such as an aqueous polyhydric alcohol solution and then is dried under inflation to produce a cellulose film. The gel tubing is initially dried down to a moisture content of less than 10% and preferably 3 to 5% moisture based on the weight of dry cellulose to form a cellulose film. The moisture content based on the weight of dried cellulose is sometimes referred to as the percent of moisture to bone dry gauge or "BDG." Unless otherwise stated, all moisture contents mentioned hereinbelow are on a dry cellulose basis (BDG). Drying the gel tube to a moisture content of 3 to 5% BDG is believed to establish hydrogen bonding in the cellulose structure which is responsible for many end-use properties of the resulting tubular film.

After drying to establish the hydrogen bonding, the tubular cellulose film is remoisturized to a moisture content of about 10 to 20% BDG or higher to provide the film with the suppleness needed for handling and further processing the film without damaging it.

The inflation during the dring process serves to provide the cellulose film with a degree of orientation that also contributes to the properties of the cellulose film. For example, with the conventional derivatized cellulose casing, it is customary to dry the tubing of cellulose gel while holding it by inflation at a diameter that is about 20 to 30% greater than the extrusion diameter to provide transverse direction (TD) orientation. In addition, the tubing is longitudinally stretched by drawing it in the machine direction about 1 to 3% over its length in the gel state to provide a machine direction (MD) orientation.

According to U.S. Pat. No. 2,999,757, the orientation provided by this transverse and longitudinal stretching provides the casing with certain desirable properties including a lower degree of distension upon being subjected to stuffing pressures and the ability to produce a more consistent and uniform diameter of sausage. The '757 Patent further says that diametrically stretching the casing less than about 35% in the transverse direction does not appreciably improve the casing characteristics whereas stretching it more than about 55% is difficult and presents operating problems. When stretched beyond about 55%, the casing is more apt to break in the dryer. Thus, according to the teachings of the '757 Patent, the upper limit of transverse orientation for a derivatized cellulose casing is about 55%.

Orienting the film makes it less extensible so that when the casing is stuffed, a change in the stuffing pressure will not result in a substantial change in the stuffed diameter of the sausage. This is a desirable property as it contributes to the production of sausages having a uniform diameter as noted in the '757 Patent. In particular, it is customary to design a sausage casing to operate at a desired stuffing diameter. When stuffed to this desired or recommended stuffed diameter (RSD), the portion of the curve plotting casing diameter against stuffing pressure is relatively flat so the diameter of the sausage remains substantially constant over a wide range, of stuffing pressures. Sausage manufacturers take advantage of this casing property in that it allows the casing to be tightly stuffed under high pressures of up to about 250 mm of mercury without exceeding a desired diameter.

One drawback of this orientation is that the casing tends to shrink back. to its extruded diameter when it is rewet. The casing is rewet to various degrees when it absorbs moisture during processing or use. For example, the casing is rewet during the shirring of the casing as it as it absorbs moisture from the shirring solution. It also is rewet during stuffing as it absorbs moisture from the fluid products being stuffed into the casing. Excessive shrinkage of the casing during either shirring or stuffing is not desired. Shrinkage during the shirring operation causes the shirred casing to grip tightly about the shirring mandrel. Consequently, damage may result to the casing if excessive force is needed to doff the shirred casing from the mandrel. On the other hand, excessive shrinkage of the casing about the food product stuffed and processed in the casing may cause the casing to split, or the casing may adhere so tightly to the food product that it is difficult to peel the casing from the food product after processing.

Excessive shrinkage is a particular problem with respect to a casing formed of a non derivative cellulose. In this respect it has been found that a non derivatized cellulose casing is much more extensible than its derivatized counterpart. For example, U.S. Pat. No. 5,658,524 discloses that non derivatized cellulose can be diametrically stretched upwards of 200% during the drying cycle. The greater extensibility of the non derivatized casing means that during stuffing, it undergoes a greater diameter change with smaller changes in stuffing pressure than does a comparable derivatized cellulose casing. To compensate for the more extensible nature of the derivatized cellulose casing, it was found necessary to dry the tubing of cellulose gel while holding it under inflation at a diameter of 70 to 80% greater than its extruded diameter. While drying the cellulose gel under these conditions allowed for better control of the stuffed diameter of the casing, the resulting increase in the shrinkage rate upon the casing becoming rewet caused other problems.

For example, because the casing retained a relatively large amount of a shrink (due to its greater degree of orientation), the diameter of the shirring mandrel had to be reduced in order to accommodate the greater amount of shrinkage. This in turn resulted in an undesirably smaller bore diameter of the shirred casing article. Upon stuffing, the casing shrank even more which resulted in the casing being so tight around the sausage in the casing that conventional peeling operations were not satisfactory. Changes in shirring solutions and methods and changes in peeling solutions and methods only marginally solved the various problems caused by the greater inherent extensibility of a casing formed of a non derivatized cellulose.

Accordingly, the problem to be solved is to provide an oriented food casing of a non derivatized cellulose that exhibits resistance to stretching during stuffing so that it maintains a substantially constant diameter over a range of stuffing pressures, while at the same time minimizing the rewet shrinkage of the casing. Prior to the present invention, the method of forming a casing of a non derivatized cellulose represented a compromise of properties in that the method steps for reducing the extensibility of the casing resulted in an increase in the rewet shrinkage. Conversely, method steps to reduce rewet shrinkage resulted in an increase of the extensibility of the casing.

OBJECTS OF THE INVENTION

One object of the invention is to provide a food casing formed of a nonderivatized cellulose having a reduced rewet shrinkage.

Another object of the present invention is to provide a food casing formed of a non derivatized cellulose that maintains a relatively constant diameter over a range of stuffing pressures.

A further object is to provide a food casing of non derivatized cellulose having both a reduced rewet shrink and reduced diametrical extensibility under stuffing pressures.

Yet another object is to provide an improved method of forming a seamless non derivatized cellulose tubular film suitable for use as a food casing.

A still further object of the present invention is to provide a method of forming a seamless non derivatized cellulose tubular film that has both a reduced extensibility, so its stuffed diameter remains relatively constant with changes in stuffing pressure, and a reduced rewet shrinkage.

SUMMARY OF THE INVENTION

The present invention provides a practical method for the manufacture of a seamless tubular film of a non derivatized cellulose that is suitable for use as a food casing for the production of frankfurters and the like. Suitability for use as a food casing requires that a tubular film intended to make a sausage of a desired diameter be dimensionally stable at the desired diameter over a range of stuffing pressures. Suitability further requires that the tubular film exhibit a minimum of shrinkage when rewet. In accordance with the present invention these desirable attributes are provided by controlling the conditions under which the tubular film is dried and moisturized.

Even though it has been recognized that a non derivatized cellulose casing has a greater extensibility and rewet shrinkage than a derivatized cellulose casing, it has been unexpectedly and surprisingly found that properties of dimensional stability and low rewet shrinkage can be built into the tubular film of non derivatized cellulose by controlling certain method steps during the formation of the film. For example, as noted above, an extruded tube of cellulose gel is dried and moisturized to form the cellulose film. It has been found that the inflation of the extruded tube during drying and moisturizing can be altered to change the rewet shrinkage and extensibility of the resulting film.

Accordingly, one embodiment of the invention involves partially drying the tube of cellulose gel while holding it at a first inflated diameter, completing the drying to establish hydrogen bonding of the cellulose while holding it at a second inflated diameter and then moisturizing the cellulose while holding the second diameter.

In another embodiment the extruded tube of cellulose gel is completely dried to establish hydrogen bonding while holding a first inflated diameter and then the dried cellulose is moisturized while holding it at a second inflated diameter.

For use as a food casing where lower values of rewet shrink are desired, the amount of the first inflation is greater than second. This has been found to decrease the total rewet shrinkage as compared to drying and moisturizing under a single inflated condition. While not preferred, if for some reason a high shrink and low extensibility are desired, the method of the present invention allows for such application by reversing the conditions such that the first inflated diameter is less than the second.

Accordingly, in its broadest aspect, the present invention may be characterized by a method of forming a tubular cellulose film of a desired diameter having selected properties of extensibility and rewet shrink comprising:

a) extruding and regenerating a seamless tube composed of a non derivatized cellulose gel;

b) at least partially drying the tube of cellulose gel while holding it at a first inflated diameter different from the desired diameter to form a cellulose film; and c) moisturizing the cellulose film while holding a second inflated diameter equal to the desired diameter.

In another aspect, the present invention may be characterized by the steps of:

a) drying an extruded tube of non derivatized cellulose gel to a moisture content of less than 5% BDG to effect hydrogen bonding of the cellulose while holding the tube at a first inflated diameter greater than a desired diameter;

b) moisturizing the dried tube to a moisture content of between 10 to 15% BDG while holding the first inflated diameter;

c) collapsing the tube to a flat width;

d) inflating the tube to a second diameter substantially equal to the desired diameter; and e) moisturizing the tube to a moisture content of between 12 to 25% BDG while holding the second inflated diameter.

In yet another aspect, the present invention may be characterized by:

a) partially drying the tube of cellulose gel to a first moisture content while holding it at a first inflated diameter;

b) collapsing the partially dried tube to a flat width; and c) inflating the partially dried tube to a second diameter different from the first inflated diameter and maintaining the second inflated diameter while further drying the tube to a second moisture content below about 5% BDG; and d) moisturizing the dried tube to a moisture content above 10% BDG while maintaining the second inflated diameter thereby forming a tubular to film composed of non derivatized cellulose having shrinkage properties different from the same tube of cellulose gel dried to the same desired diameter and moisture content with only a single inflation.

In still another aspect the present invention may be characterized by a method of forming a seamless non derivatized cellulose tubular film of a desired diameter suitable for use as a sausage casing comprising:

a) continuously forming by extrusion and regeneration, an extruded: seamless tube composed of a hydrated non derivatized cellulose gel having a moisture content greater than 150% BDG, the extruded seamless tube having a substantially uniform diameter smaller than the tubular film desired diameter;

b) inflating the extruded seamless tube to a first diameter larger than the tubular film desired diameter;

c) holding the extruded tube at the first inflated diameter while drying it to a first moisture level of about 15 to 50% BDG thereby forming a partially dried tube;

d) collapsing the partially dried tube to a flat width;

e) reinflating the partially dried tube to a second diameter substantially equal to the tubular film desired diameter;

f) holding the partially dried tube at the second diameter while further drying the tube to a moisture content of less than 5% BDG; and thereafter g) raising the moisture content of the dried cellulose tube from less than 5% BDG to about 15 to 20% BDG thereby forming a seamless non derivatized cellulose tubular film having enhanced rewet shrinkage properties as compared to a similar cellulose tube that is dried and moisturized while holding at a single inflated diameter.

In a stillfurther aspect, the present invention may be characterized by a tubular film suitable for use as a sausage casing formed by drying a tube of a non derivatized cellulose gel under conditions including partial drying at a first inflated diameter larger than a desired diameter, which preferably is the desired stuffed diameter, followed by further drying and moisturizing at a second inflated diameter substantially equal to the desired diameter, the film having a degree of diametrical dimensional stability over a range of stuffing pressures and a lower rewet shrink as compared to a film formed under the same conditions only with a single drying diameter.

For purposes of using the non derivatized film as a food casing, its rewet shrinkage should be less than about 13.5% and preferably less than 7.5% with shrinkage less than 2 to 3% being most preferred. The extensibility of the tubular film should be relatively flat over a range of pressures so that a change in pressure at which the casing is stuffed results in little or no change in the diameter of the casing. For example over an internal pressure range of 200 to 250 mm of mercury, the extensibility preferably should be less than 1.08. Here the extensibility is $D_2/D_1$ where $D_1$ is the diameter at the lower pressure and $D_2$ is the diameter at the higher pressure.

For purposes of using the non derivatized tubular film as a food casing, it has been found that in the course of drying to set the film properties, the film should have a final orientation of greater than 1.5 times the diameter of the extruded tubeand preferably about 1.7 to 1.8 times the diameter of the initial extrusion. Thus, according to the present invention, after regeneration and while the extruded tube is in its gel state (moisture content of 150% or more based on the weight of the cellulose) the first inflation is to a greater diameter or more than 1.7 to 1.8 times the diameter of the extruded tube. The first inflated diameter should be greater than about 1.8 times the diameter of the extruded tube and preferably nearer to 2 times or more the diameter of the extruded tube.

The residence time in the first drying stage (where the greatest inflation occurs) should be sufficient to reduce the moisture content of the extruded tube to about 20 to 50% BDG. It is believed that at this moisture level the cellulose of the partially dried film has not undergone hydrogen bonding. The moisture level of 20 to 50% BDG is believed to be low enough to modify properties and yet leaves the partially dried film sufficiently flexible so it can be collapsed and reinflated to a diameter of 1.7 to 1.8 times the diameter of the extruded film for the second drying stage. In the second drying stage the partially dried tube from the first stage is dried to a moisture level of 5% or less to effect the hydrogen bonding of the cellulose. After drying to this low level to set the film properties, the film is moisturized by passing it through a humid environment to raise its moisture content of about 10 to 12% BDG and preferably higher. This provides the film with the suppleness and flexibility that allows it to be handled for further operations such as winding it onto a reel.

In an alternate embodiment, the moisture content in the first drying stage is driven down to as low as 5% or less while holding the casing at a first inflated diameter to effect the hydrogen bonding of the cellulose. While holding this diameter, the moisture content of the casing is increased to about 10 to 12%. After moisturizing, the casing is collapsed and reinflated to a second diameter. While holding this second diameter, the moisture content of the casing is raised to about 17 to 20% BDG or higher. The effect on the final properties is the same in that a non derivatized cellulose casing made in this fashion has diametrical stability over a range of stuffing pressures at the recommended stuffed diameter while exhibiting a lower rewet shrinkage than a similar casing made using a single inflation during the drying and moisturizing stages.

DETAILED DESCRIPTION OF THE INVENTION

Figure 1:
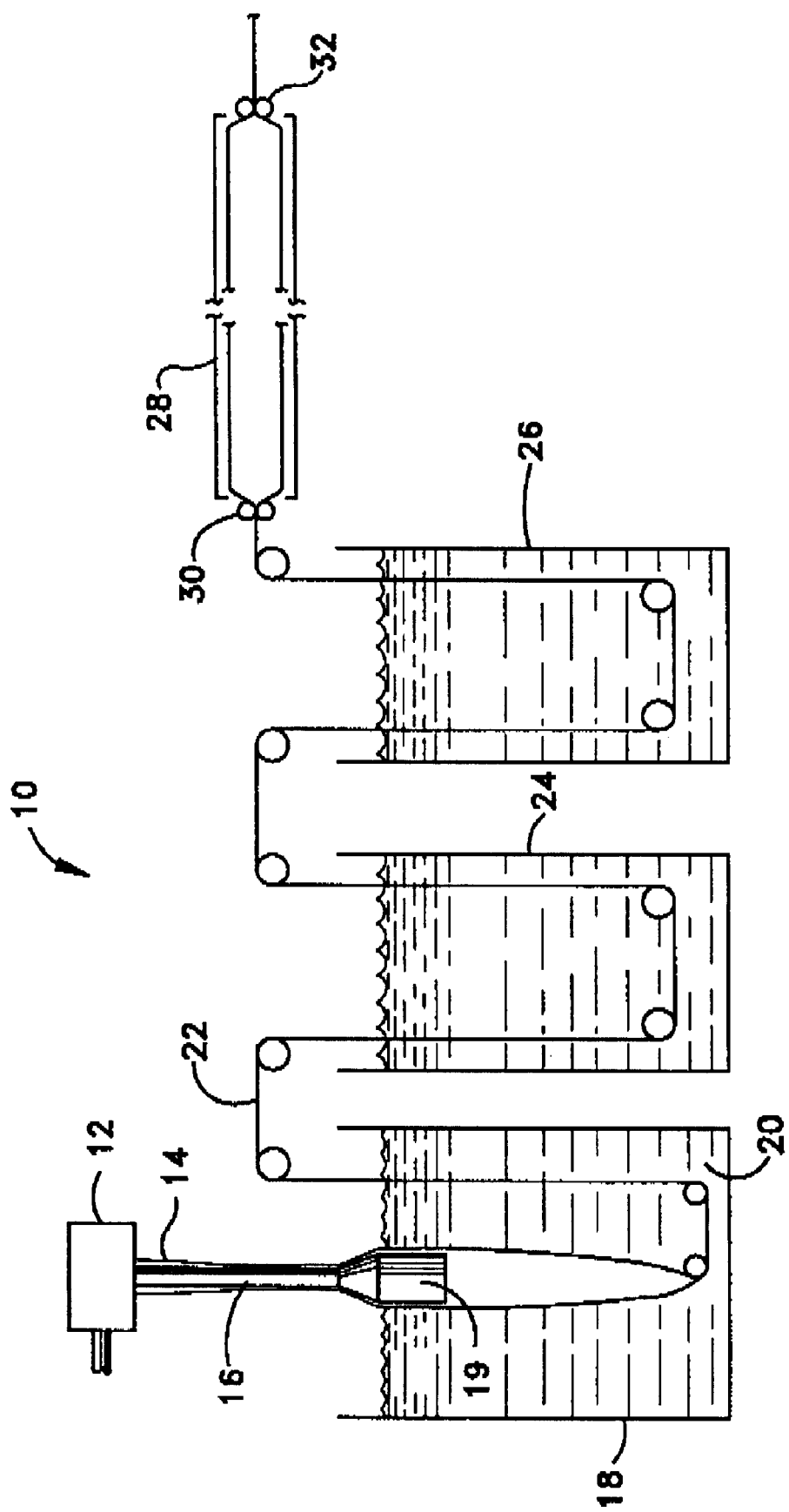
FIG. 1 is a schematic flow diagram showing an arrangement for making a non derivatized cellulose food casing.

Referring to the drawings, FIG. 1 shows the apparatus generally indicated at 10 during the course of a steady state operation to produce a seamless tubular film of non derivatized cellulose suitable for use as a sausage casing. The apparatus includes a die 12 arranged to downwardly extrude a thermoplastic solution to form a seamless tube 14. The solution generally is a solution of a natural cellulose (such as wood pulp) dissolved in a cellulose solvent comprising N-methyl-morpholine-N-oxide (NMMO) and water. Methods of making the solution (hereafter called "dope") for extrusion either as filament or film are well known in the art and form no part of the present invention.

Process parameters affecting the properties of the resulting article are disclosed in U.S. Pat. Nos. 5,277,857; 5,451,364; and 5,658,525 among others. Apparatus relevant to tubular extrusion of the cellulose solvent include U.S. Pat. No. 5,597,587; 5,759,478; and 5,766,540. While the cellulose solution is described herein as forming a tubular film comprising a continuous phase of non derivatized cellulose, the invention also is useful for forming tubular films of a cellulose composite comprising cellulose fibers uniformly dispersed in a continuous phase of non derivatized cellulose. Examples of the latter type of film are disclosed in U.S. Pat. Nos. 5,603,884 and 5,744,251.

For purposes of forming a small diameter food casing as may be used in the production of frankfurters or the like, the extrusion orifice of die 12 is about 10 to 38 mm in diameter although other diameters can be used. The extrusion occurs about a mandrel 16 that depends from the die. The extruded tube passes over the mandrel and into a tank 18 containing a bath of a non solvent liquid 20. The mandrel has a sizing portion 19 that may be about the same diameter as the diameter of the extrusion orifice, but is preferred to be larger in diameter than the extrusion orifice so that the extruded tube is stretched diametrically as it passes over the sizing portion of the mandrel. For example, in an embodiment of the invention wherein the extrusion nozzle is 15.88 mm (0.625 in.) in diameter, the mandrel sizing portion may be about 20.83 to 26.92 mm (0.82 to 1.06 in.) in diameter. Thus the extrusion preferably is diametrically stretched as it passes over the sizing portion 19 so it has a diameter upon entering the bath which is larger than the diameter at the extrusion nozzle.

In the bath, the NMMO solvent is drawn from the extruded tube causing regeneration of the dissolved cellulose to form a tube of pure cellulose 22 in the form of a gel. In the case of a composite extrusion, the tube includes cellulose fibers uniformly dispersed in a matrix of the cellulose gel. The so called "gel tube" 22 subsequently is washed by passing through wash tanks 24. In a preferred washing method, the tube is exposed to increasingly hotter wash water to remove residual amounts of the solvent. The washed tube of cellulose gel then is passed through a dip tank 26 to contact the tube with a polyol solution (not shown) as is conventional in casing manufacturing methods. The polyol, as for example, glycerine, plasticizes the gel tube so it remains flexible when dried.

After the dip tank, the gel tube passes into a drier 28. It is conventional to inflate the gel tube in the drier as set out herein above in order to impart a degree of orientation to the cellulose as it is dried. Inflation of the gel tube is maintained in the drier by sets of nip rolls 30, 32 at the drier entrance and exit. As noted above, drying cross links the cellulose through hydrogen bonding and sets the properties of the resulting cellulose film.

Figure 2A:
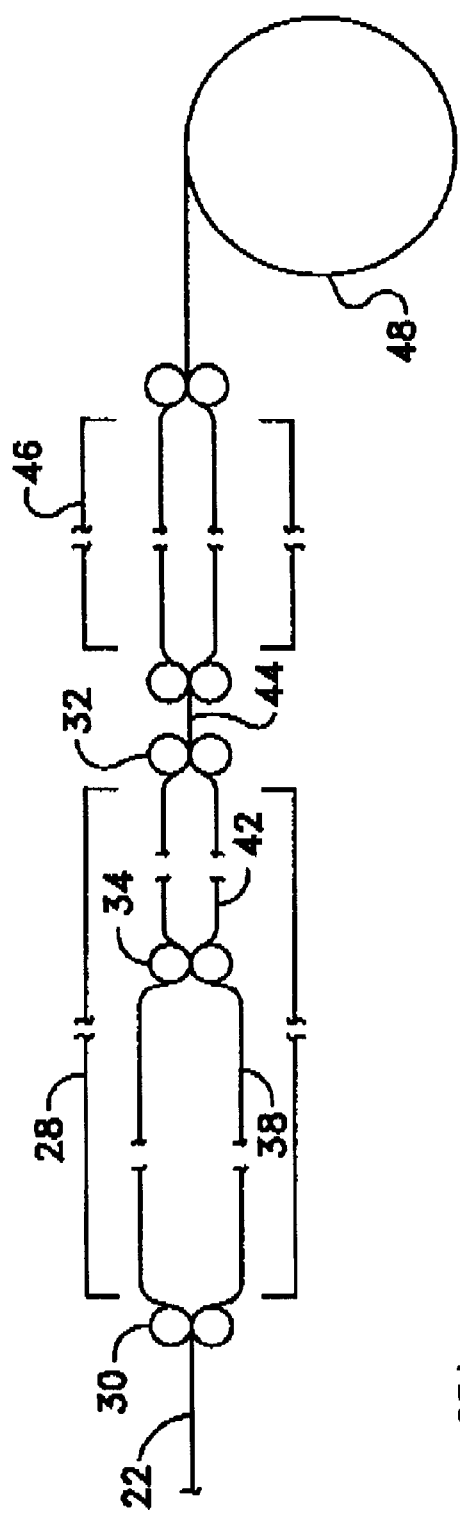
FIG. 2A is a view similar to FIG. 1 only showing the drier stages in greater detail.
Figure 2B:
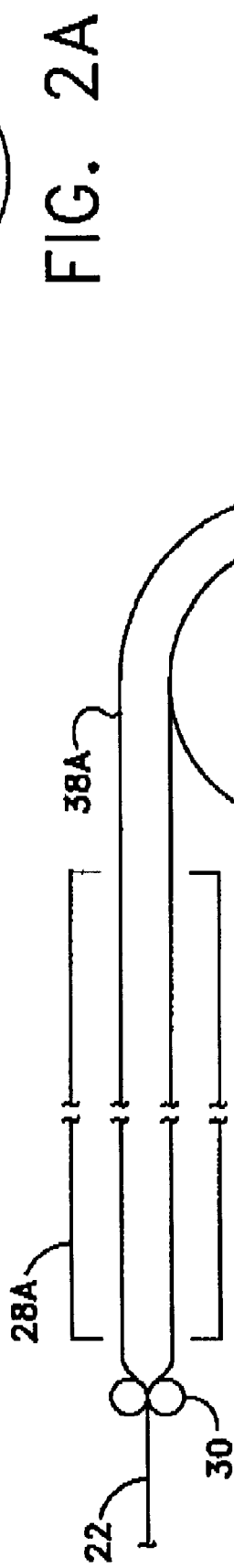
FIG. 2B is a view showing another embodiment of the drier stage of FIG. 2A.

In accordance with the present invention, the gel tube is dried in two stages and under two different inflation conditions. As shown in FIGS. 2A and 2B, this two stage drying or "double bubble" is accomplished with the assistance of a second set of nip rolls 34 set between the sets 30, 32. In this respect, the gel tube between the nip rolls 30, 34 is inflated to form a "first bubble" 38 having a diameter larger than the extruded diameter of the gel tube 22. The gel tube is partially dried in the drier while holding this diameter and this comprises the "first" drier stage. After partial drying, the partially dried tube 38 tube is collapsed to a flat width by nip rolls 34. The collapsed, partially dried tube then is reinflated between nip rolls 34, 32 to form a second bubble 42 having a diameter different than the first bubble for completion of the drying. This second inflation in the drier is considered the "second" drier stage.

For purposes of completing the hydrogen bonding and setting the properties of the cellulose, it is necessary to dry the cellulose in the drier 28 to a moisture content below 10% and preferably to a moisture content of 3 to 5% BDG. At this low moisture content, the cellulose is somewhat brittle even with the plasticizer so it is conventional to pass the dried cellulose tube, indicated at 44, through a moisturizing chamber 46 (shown only in FIG. 2A) to increase the moisture content of the cellulose to above about 10% and preferably to about 20% BDG. At this moisture content, the cellulose, can be flattened and reeled onto a storage reel 48 without damage to the cellulose film.

An alternative and shorter drier path is illustrated in FIG. 2B. In FIG. 2B, the first inflation and partial drying occurs in a first drier portion 28A. The partially dried casing 38A exits the first drier portion and passes around a turn roll 50 that directs the partially dried casing in a reverse direction. The partially dried casing then is nipped by nip rolls 34A and is reinflated for forming a second bubble 42A that passes through a second drier portion 28B, this being the second stage of the drier. In this embodiment it is necessary that the moisture content of the cellulose tube at the turn roll 50 be above 25% BDG and preferably in the 25% to 50% BDG range to prevent damage to the partially dried cellulose tube as it passes over the turn roll.

Figure 3:
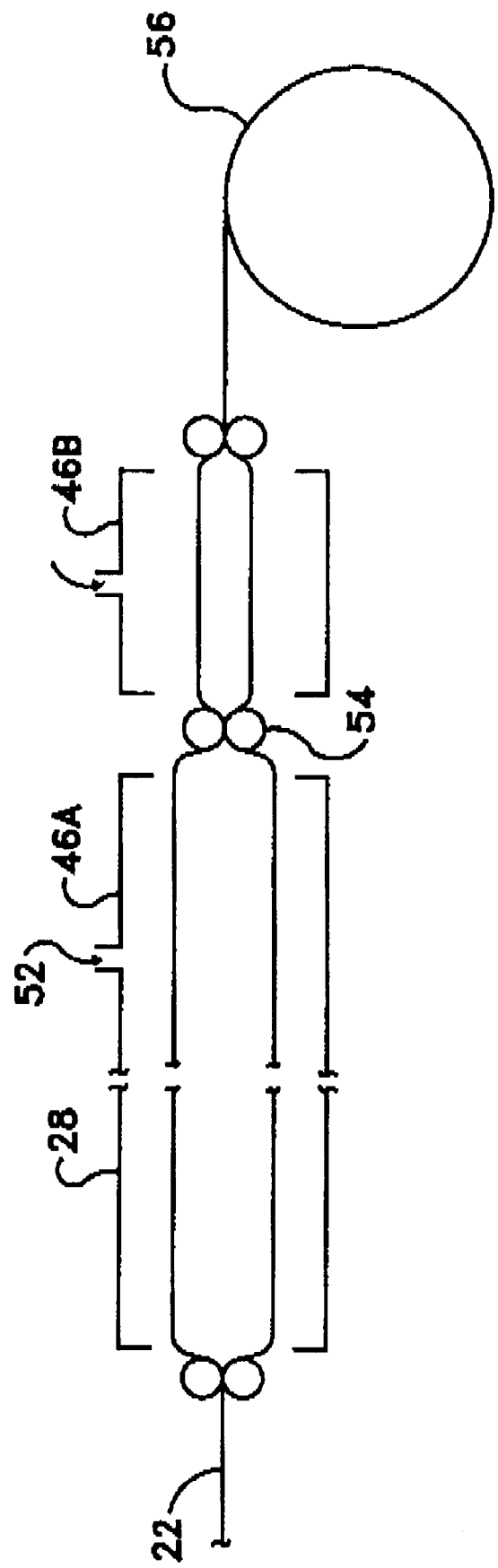
FIG. 3 is a view showing a second embodiment if the invention.

In a second embodiment of the invention as illustrated in FIG. 3, the inflated diameters in the drying and moisturizing stages define the "double bubble". In this respect, the gel tube of non derivatized is dried to a moisture level of 5% or less while holding the tube at a first inflated diameter. The moisture content of the dried tube then is increased to about 10 to 12% BDG while holding the first diameter. After moisturizing, the tube is collapsed and reinflated to a second diameter. While holding the second diameter, the moisture content of the cellulose is raised to 15 to 20% or more.

As shown in FIG. 3, the extruded gel tube 22 enters the, drier 28 at a first inflated diameter. The temperature and residence time in the drier are such that the moisture content of the cellulose is reduced to 5% or less while maintaining the first inflated diamreter. This effects the hydrogen bonding of the cellulose. Thereafter, the first inflated diameter is maintained while passing the dried cellulose tube through a first moisturizing chamber 46A. Steam or moist air is introduced into the first moisturizing chamber at 52 so as to raise the moisture content of the cellulose to about 10 to 12% BDG. As the moisturized cellulose tube leaves the first moisturizing chamber 46A, it is collapsed to a flat width by nip rollers 54. The cellulose tube is then reinflated to a second diameter and further moisturized in a second moisturizing chamber 46B. The moisture content of the cellulose is increase to about 15 to 20% BDG or higher while holding the second inflated diameter. On leaving the second moisturizing chamber, the moisturized cellulose tube is collapsed and wound onto a take-up reel 56.

It has been surprisingly and unexpectedly found that partially drying the cellulose at one inflated diameter and then completing the drying and subsequently moisturizing the cellulose under a different inflated diameter, in the case of a non derivatized cellulose casing, acts both to reduce the extensibility of the casing during stuffing and also reduces the rewet shrinkage of the casing. The results of tests conducted to demonstrate the advantages of such double bubble drying and moisturizing are reported in Tables I and II. In each of the tests the flat width both wet (WFW) and dry (DFW) of the casing as reported in the Tables is an average measurement of five samples. The wet flat width is a measurement of the flat width of the casing gel stock prior to entering the drier. The first and second dry flat widths reported in the Tables are measurements of the casing flat width after the first and second bubbles respectively. The percent of shrinkage is determined by soaking a casing sample in room temperature water for one hour to rewet the casing. The rewet flat width is then measured and this value subtracted from the original dry flat width of the casing. The difference is then divided by the dry flat width to determine the percentage of shrinkage. Extensibility is determined by inflating the rewet sample with air and measuring the diameter of the inflated casing at 200 and 250 mm of Hg.

EXAMPLE I

This sample is a control wherein the casing is dried and moisturized using a single inflation condition as is conventional in the art. The extruded casing gel stock having a flat width of 20.57 mm (0.81 inches) was dried to below about 5% BDG and then moisturized to about 15% BDG while holding it under a single inflation condition. This provided a casing having a dry flat width of 36.07 mm (1.42 inches) meaning that the transverse orientation was 1.42/0.81 or 1.75. The casing was rewet by soaking in water for one hour and determined to have a shrinkage value of 11.6%. The extensibility of the casing was determined as described above by inflating the rewet casing and measuring the inflated diameter at 200 and 250 mm of Hg respectively. The diameter of the casing increased from 24.93 mm (0.981 inches) to 26.92 mm (1.06 inches) with the change in pressure giving a $D_2/D_1$ of 1.08.

For purposes of a commercial application, the ratio of the stuffing diameters or $D_2/D_1$ should be not greater than about 1.19. Accordingly, the control had an acceptable increase in casing diameter of about 8% over an internal pressure change of 50 mm of Hg together with a rewet shrinkage rate of about 11.6%. For commercial applications a shrinkage value of less than 12% is acceptable but values closer to 3% are preferred.

EXAMPLE II

Two samples of this Example II represent embodiments of the present invention. These two samples A and B, were extruded in the same way as the casing of Example I except that the wet flat widths varied slightly from that of Example I due to process variations. Sample A had an initial WFW of 20.82 mm (0.82 inches) whereas Sample B had an initial WFW of 20.32 mm (0.80 inches). Both samples were dried using the double bubble method of the present invention such that the final dry flat width of $DFW_2$ was about the same as the target value of the casing in Example I, namely about 36.06 mm (1.42 inches). Thus, the casings of this Example II and the control casing of Example I were comparable in that they all had substantially the same DFW and the same TDO of about 1.75.

For Sample A, partial drying was done at an inflation that produced a transverse direction orientation (TDO) of 1.83 times the wet flat width. Accordingly, at the end of the partial drying the tube had a flat width ($DFW_1$) of 38.1 mm (1.5 inches) which was greater than the target value of 36.06 mm. However, in the second drying stage for completing the drying, and in the moisturizing stage, the tube was inflated to a lower pressure. The result was a casing having a dry flat width ($DFW_2$) of 36.32 mm (1.43 inches) so that the casing of Sample A, when leaving the dryer and moisturizer, had a DFW and TDO just slightly higher(due to process variations) than the casing of Example I.

Sample B was similar in that the gel tubing had a WFW of 20.32 mm (0.8 inches). Partial drying was done at an inflation that produced a TDO of 2.05 times the wet flat width. Accordingly, at the end of the partial drying, the tube had a $DFW_1$ of 41.65 mm (1.64 inches), also greater than the target value. In the second drying stage and in the moisturizing stage, the tubing was inflated to a lower internal pressure so that at the completion of drying and moisturizing, the casing had a $DFW_2$ of 36.06 m (1.42 inches) and a TDO of to 1.78 that, again, was comparable to the DFW of the control casing of Example I. The two samples A and B were tested for extensibility over the same internal pressures of 200 250 mm of Hg and for shrink in the same way as the sample of Example I. The results of these tests also are reported in Table I.

Table I shows that the rewet shrinkage of Sample A was only 7.5% and that of Sample B was only 6.1%, both considerably lower than the rewet shrink of the control casing of Example I. In addition, $D_2/D_1$ values of both Samples A and B were slightly less than that of the control. Accordingly, the double bubble method of the present invention wherein the inflations were such that $DFW_1$ is greater than $DFW_2$, produced a casing of non derivatized cellulose that was desirably less extensible at the RSD than a casing made using a single drying stage while having much less rewet shrinkage than the casing of the control Example I.

EXAMPLE III

Another test was conducted to evaluate the effect of using the same inflation in both stages of the double bubble. For this test the same procedures were followed as in the previous examples to produce a gel tube having a wet flat width of 20.82 mm (0.82 inches). Using the double bubble apparatus as shown in FIG. 2, the gel tube was dried in two stages wherein the inflation in both stages and in the moisturizer provided a TDO of 1.75. Thus the casing produced had the same or nearly the same DFW as the control of Example I and Samples A and B of Example II, 36.06 mm (1.42 inches). However, while the extensibility of the casing as measured by $D_2/D_1$ is comparable to the control, the rewet shrink of the casing increased substantially to 13.5%. This result demonstrates that using the same inflation in both stages of the double bubble such that $DFW_1$ is equal to $DFW_2$, is not effective to reduce the shrink of the casing.

EXAMPLE IV

A second embodiment of the present invention is demonstrated in this example. Here, two gel tube satnples C and D were prepared as previously described. Sample C had a WFW of 20.82 mm (0.82 inches) and Sample D had a WFW of 20.32 mm (0.8 inches). Thus both were comparable to the control sample of Example I and to the other samples. Drying was performed using the double bubble method except that in this example, the partial drying was conducted at an inflation that was less than the second such that $DFW_1$ was less than $DFW_2$. The result in both cases is a casing having a dry flat width comparable to all other examples. Theextensibility ratio of $D_2/D_1$ for Sample C was comparable to all previous examples but the extensibility of Sample D was higher and above the acceptable range of 1.10. However, the degree of shrink in both Samples C and D was higher than all others including the control sample of Example I. This demonstrates the ability, if desired, of using the double bubble method to increase the shrink rate over a comparable tubular film of non derivatized cellulose made using a single inflation pressure during drying simply by selecting conditions such that $DFW_1$ is greater than $DFW_2$.

EXAMPLE V

In a further test of the present invention, a gel tube having a slightly larger WFW of 21.33 mm (0.84) was produced. It then was dried under conditions wherein the $DFW_1$ was greater than the $DFW_2$ but the difference between the two inflation rates was increased as compared to Example II. The result was a smaller casing having a DFW of 33.02 mm (1.30 inches). While the casing demonstrated a $D_2/D_1$ ratio comparable to those of Example II (an embodiment of the invention), the rewet shrink of the casing was zero.

The data of Table II show that a transverse direction orientation of about 1.75 will result in an extensibility of the non derivatized cellulose casing that is acceptable for stuffing purposes. This value of 1.75 which represents a TDO 75% greater than the diameter of the gel tube is substantially greater than the TDO upper limit for a derivatized cellulose casing of about 55% recommended by Shiner, et al US Pat. No. 2,999,757 and much greater than the 20 to 35% TDO generally applied in the manufacture of a food casing of derivatized cellulose.

Table II further shows that while extensibility remains substantially constant, the amount of shrink decreases as the absolute value of the difference between $DFW_1$ and $DFW_2$ increases. In a preferred embodiment of the present invention wherein the double bubble method is used to form a tubular film suitable for use as a sausage casing, a low shrink is most desirable. Accordingly, to reduce shrink, Table II indicates that the first inflated diameter should be greater than the first. Thus, in cases where the $DFW_1$ is greater than the $DFW_2$ and the ratio of $DFW_1/DFW_2$ is greater than 1, casings with an acceptable rewet shrinkage of less than about 11% are produced. If the ratio approaches 1.32 (Example V) the potential exists for reducing the shrink to zero.

In a less preferred embodiment of the invention, the percent of shrink is increased by employing a ratio of $DFW_1$ to $DFW_2$ that is one or less such that the first inflated

TABLE I

| | WFW mm (in.) | $DFW_1$ mm (in) | $TDO_1$ | $DFW_2$ mm (in) | $TDO_2$ | % Shrink | Diameter mm (in) $D_1$* | $D_2$* | $D_2/D_1$ |
|---|---|---|---|---|---|---|---|---|---|
| Example I Control | 20.57 (0.81) | — | — | 36.07 (1.42) | 1.75 | 11.6% | 24.93 (0.098) | 26.92 (1.06) | 1.08 |
| Example II Sample A | 20.82 (0.82) | 38.10 (1.5) | 1.83 | 36.32 (1.43) | 1.76 | 7.5% | 27.43 (1.08) | 29.21 (1.15) | 1.06 |
| Example II Sample B | 20.32 (0.8) | 41.66 (1.64) | 2.05 | 36.07 (1.42) | 1.78 | 6.1% | 27.18 (1.07) | 28.96 (1.14) | 1.07 |
| Example III | 20.82 (0.82) | 30.06 (1.42) | 1.75 | 30.06 (1.42) | 1.75 | 13.5% | 24.64 (0.97) | 26.16 (1.03) | 1.06 |
| Example IV Sample C | 20.57 (0.81) | 32.0 (1.26) | 1.55 | 36.07 (1.42) | 1.75 | 17.6% | 23.11 (0.91) | 24.89 (0.98) | 1.08 |
| Example IV Sample D | 20.83 (0.82) | 32.0 (1.26) | 1.53 | 36.07 (1.42) | 1.73 | 15.0% | 23.37 (0.92) | 25.91 (1.02) | 1.11 |
| Example V | 21.34 (0.84) | 43.69 (1.72) | 2.05 | 33.02 (1.30) | 1.55 | 0% | 27.69 (1.09) | 29.46 (1.16) | 1.06 |

*$D_1$ @ 200 mm of Hg and $D_2$ @ 250 mm of Hg

In Table II below, the $DFW_1$ minus the $DFW_2$ of the Examples and the ratio of $DFW_1$ to $DFW_2$ arranged in ascending order and the corresponding extensibility values ($D_2/D_1$) and shrink values are noted. The $TDO_2$ values also are given.

TABLE II

| | $DFW_1 - DFW_2$ mm (in.) | Ratio $DFW_1/DFW_2$ | % Shrink | $TDO_2$ | Extensibility $D_2/D_1$ |
|---|---|---|---|---|---|
| Example IV Sample C | −7.37 (−0.48) | 0.77 | 17.6% | 1.75 | 1.08 |
| Example IV Sample D | −6.68 (−0.27) | 0.77 | 15% | 1.73 | 1.11 |
| Example III | 0 | 1 | 13.5% | 1.75 | 1.06 |
| Example II Sample A | 1.78 (0.07) | 1.05 | 7.5% | 1.76 | 1.06 |
| Example II Sample B | 5.59 (0.22) | 1.15 | 6.1% | 1.78 | 1.07 |
| Example V | 10.67 (0.42) | 1.32 | 0 | 1.55 | 1.06 | diameter for the partial drying of the gel tube is smaller than the second inflated diameter.

As noted above, the moisture content of the gel tube is upwards of 150% or more based on the weight of the cellulose. In the first drying stage, according to the present invention, the tube is dried to a moisture content of about 20 to 50% to effect the partial drying of the gel tube. In the second stage, the moisture content is brought down to about 3 to 5% in order to bring about hydrogen bonding and set the properties of the resulting tubular cellulose film. If the path of the tube is redirected after the first or partial drying stage, such as by reversing the direction of the tube as shown in FIG. 2B, the moisture content after the partial drying should be at least 25% based on the weight of the cellulose. Having the moisture less than about 25% risks damage to the casing as it passes over turn roll 50 to reverse its direction.

In the embodiment as shown in FIG. 3, the inflated diameter in the drier and in the first moisturizing stage are the same. Here, by increasing the moisture content to about 10 to 12%, the casing can be collapsed and inflated to the second diameter with out damage for further moisturizing.

Thus, it should be appreciated that the present invention accomplishes its intended objects in providing a tubular film of a non derivatized cellulose having a reduced rewet shrink suitable for use as a sausage casing. In its method aspect, the present invention provides for the control of the rewet shrink by a drying and remoisturizing under double bubble conditions. In a preferred application, the rewet shrink is reduced to below 11% by partial drying under a first TDO condition and then completing the drying and remoisturizing under a second TDO condition wherein the first TDO condition is greater than the second. In a second embodiment the drying and partial moisturizing is conducted under a first TDO and then further amoisturizing is conducted under a second TDO condition.

While the examples all involve use of regenerated non derivatized cellulose films, the invention equally is applicable to a composite film comprising cellulose fibers uniformly distributed in a matrix of regenerated non derivatized cellulose.

Having described the invention in detail, what is claimed as new is:

1. A seamless non derivatized cellulose tubular film suitable for use as a food casing made by the method of:
controlling the drying and moisturizing of an extruded and regenerated seamless tube of non derivatized cellulose gel having a given extruded diameter, said drying and moisturizing comprising:
a) drying the extruded tube of cellulose gel while holding it at a first inflated diameter that is greater than the given extruded diameter to provide a dried film having a moisture content lower than the desired moisture content; and
b) moisturizing the dried film while holding it at a second inflated diameter less than the first inflated diameter to provide said tubular film with the desired moisture content;
wherein said tubular film is a rewet shrinkage in the width direction not greater than 7.5% and the tubular film, when rewet having an extensibility ratio not greater than 1.07, wherein the extensibility ratio is determined by dividing the diameter of the rewet casing when inflated to under a pressure of 250 mm of Hg by the diameter when inflated under a pressure of 200 mm of Hg; and wherein said tubular film has a diameter at least 1.55 times the diameter of said extruded seamless tube.

2. A seamless tubular film as in claim 1 comprising a matrix of regenerated nonderivatized cellulose and cellulose fibers uniformly distributed in the matrix.

3. A tubular film of a desired diameter suitable for use as a food casing formed by drying a tube of an extruded and regenerated non derivatized cellulose gel under conditions including drying at a first inflated diameter larger than a desired diameter followed by moisturizing at a second inflated diameter substantially equal to the desired diameter, the film having a degree of diametrical dimensional stability over a range of stuffing pressures and a rewet shrink in the width direction of not greater than 7.5%.

4. A method of forming a seamless, non derivatized cellulose tubular film suitable for use as a food casing comprising:
a) drying an extruded and regenerated seamless tube of non derivatized cellulose gel while holding it at a first inflated diameter that is greater than the given extruded diameter to provide a dried film having a moisture content lower than the desired moisture content; and
b) moisturizing the dried film while holding it at a second inflated diameter less than the first inflated diameter to provide said tubular film with the desired moisture content thereby forming a tubular film composed of non derivatized cellulose, the tubular film having a rewet shrinkage in the width direction not greater than 7.5% and when rewet having an extensibility ratio not greater than 1.07, wherein the extensibility ratio is determined by dividing the diameter of the rewet casing when inflated to under a pressure of 250 mm of Hg by the diameter when inflated under a pressure of 200 mm of Hg; and wherein said tubular film has a diameter at least 1.55 times the diameter of said extruded seamless tube.

5. A method according to claim 4, wherein said seamless tubular film comprises a matrix of regenerated nonderivatized cellulose and cellulose fibers uniformly distributed in the matrix.

6. A method of forming a seamless, non derivatized, cellulose tubular firm suitable for use as a food casing comprising drying a tube of an extruded and regenerated non derivatized cellulose gel under conditions including drying at a first inflated diameter larger than a desired diameter followed by moisturizing at a second inflated diameter substantially equal to the desired diameter, thereby forming a tubular film composed of non derivatized cellulose having a degree of diametrical dimensional stability over a range of stuffing pressures and a rewet shrink in the width direction of not greater than 7.5%.

* * * * *